United States Patent
Garris

[15] 3,663,382
[45] May 16, 1972

[54] PROCESS OF RECOVERING HYDROGEN FLUORIDE FREE OF ARSENIC BY DISTILLATION

[72] Inventor: George J. Garris, Deer Park, Tex.
[73] Assignee: E. I. du Pont de Nemours and Company, Wilmington, Del.
[22] Filed: Aug. 19, 1969
[21] Appl. No.: 851,359

[52] U.S. Cl................................203/91, 23/153
[51] Int. Cl..............................................B01d 3/10
[58] Field of Search......................23/153; 203/91

[56] References Cited

UNITED STATES PATENTS

| 3,166,379 | 1/1965 | Bradley et al............................23/153 |
| 3,167,391 | 1/1965 | Swinehart................................23/153 |

OTHER PUBLICATIONS

"Hackh's Chemical Dictionary" by J. Grant, Third Ed. Revised, 1944, page 75. McGraw-Hill Book Co., Inc., New York.
AEC- tr- 3927, Port I, "The Chemistry of Fluorine and Its Inorganic Compounds" by Prof. I. G. Ryss, Moscow, 1956.
Mellor, "Comprehensive Treatise on Inorganic & Theoretical Chemistry," Vol. 2, p. 128, Chemical Library.

Primary Examiner—Norman Yudkoff
Assistant Examiner—David Edwards
Attorney—John R. Powell

[57] ABSTRACT

Anhydrous hydrogen fluoride containing less than about 3,000 parts per billion of arsenic is produced by distilling hydrogen fluoride at a pressure below 25 pounds per square inch absolute.

2 Claims, 2 Drawing Figures

Patented May 16, 1972
3,663,382
FIG. 1
FIG. 2
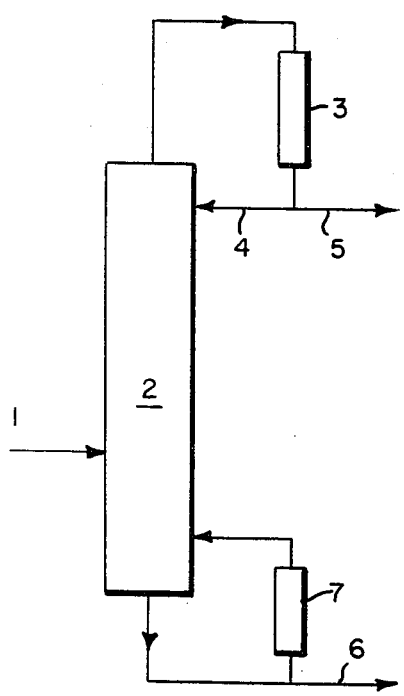
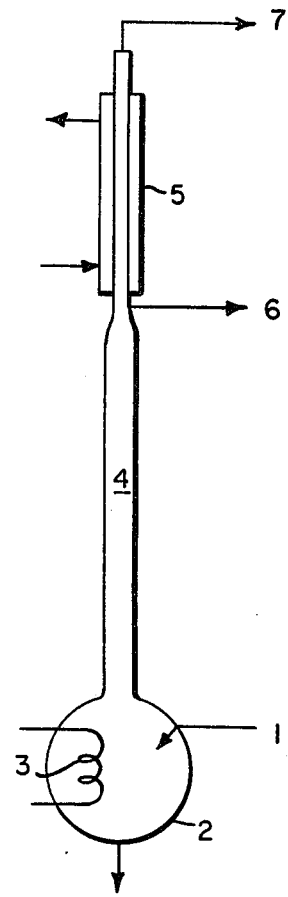
INVENTOR
GEORGE J. GARRIS
BY  John R. Powell
ATTORNEY

PROCESS OF RECOVERING HYDROGEN FLUORIDE FREE OF ARSENIC BY DISTILLATION

BACKGROUND OF THE INVENTION

This invention relates to purification of hydrogen fluoride and more particularly is directed to a process for purifying hydrogen fluoride by removing arsenic through distillation.

Within the last few years the demand for anhydrous hydrogen fluoride of very high purity has increased tremendously. The exploitation of nuclear energy and the tremendous expansion of the electronic metals industry have contributed markedly to the demand for pure hydrogen fluoride. Thus, hydrogen fluoride is used in the preparation of uranium, zirconium, and beryllium fluorides which are of primary importance in the harnessing of nuclear energy, especially in the production of very pure uranium oxide for reactors.

Very pure hydrogen fluoride is also employed in the electronic metals industry in several ways. It is used in analytical procedures for the analysis of trace amounts of arsenic in "-semi-conductor grade" silicon metal and in the silicon containing compounds, such as trichlorosilane, silicon tetrachloride and monosilane, used as raw materials for the "-semi-conductor grade" silicon metal. Hydrogen fluoride is also used as a cleaning agent and etching agent on the finished silicon electronic devices, especially as a cleaner in the production of high purity epitaxial silicon.

In the analysis of the arsenic content of materials such as high purity silicon, one often deals with arsenic levels of less than about 100 parts per billion by weight. The abbreviation ppb will be used hereinafter to mean parts per billion by weight or parts per $1.0 \times 10^9$ parts by weight. It is apparent that the hydrofluoric acid reagent used in analysis and purification of these materials must be substantially free of arsenic, and contain less than 100 ppb arsenic to avoid contaminating the material involved.

The distillation of hydrogen fluoride to prepare a pure product as well known in the art. However, such distillations are ordinarily carried out at a pressure between 35 and 100 pounds per square inch absolute to utilize water as a coolant and avoid the need for high pressure equipment, thus permitting for most economical operation.

As distillation at pressures between 35 to 100 pounds per square inch absolute does not separate arsenic from the hydrogen fluoride, separate purification steps have been required to remove this impurity. Representative of such purification steps is the process disclosed in the U.S. Pat. No. 3,166,379 which requires oxidation or halogenation of the arsenic to facilitate its removal by distillation at atmospheric pressure.

I have discovered that arsenic can be removed from hydrogen fluoride by distilling the hydrogen fluoride at pressures below 25 psia, eliminating the necessity for additional treatment steps.

SUMMARY

In summary, this invention relates to a process for producing high purity anhydrous hydrogen fluoride, containing less than about 3,000 ppb arsenic, from arsenic-containing hydrogen fluoride by distilling the arsenic-containing hydrogen fluoride at a pressure below 25 psia and removing the high purity anhydrous hydrogen fluoride as the overhead product.

This process provides a convenient, simple, and economically attractive procedure for producing high purity anhydrous hydrogen fluoride containing less than about 3,000 ppb arsenic.

BRIEF DESCRIPTION OF THE DRAWING

FIG. I is a diagram which illustrates continuous operation of the process of this invention.

FIG. II is a diagram which illustrates batch operation of the process of this invention.

DESCRIPTION OF THE INVENTION

This invention relates to the purification of hydrogen fluoride and more particularly to a process for removing arsenic from hydrogen fluoride by distillation at a pressure below 25 psia to yield essentially pure, anhydrous hydrogen fluoride containing less than 3,000 ppb arsenic.

By the process of this invention, high purity anhydrous hydrogen fluoride can be produced continuously by feeding impure hydrogen fluoride 1 to a distillation column 2 operated at a pressure below 25 psia and taking the high purity hydrogen fluoride overhead to a condenser 3. Part of the condensed overhead product is refluxed 4 to the column and the remainder of the overhead product is removed to storage 5 as highly purified anhydrous hydrogen fluoride. Low purity (high arsenic) hydrogen fluoride is taken out the bottom 6. A calandria 7 provides boil-up for the distillation column.

FIG. II is a diagram which illustrates a batch process of this invention. Impure hydrogen fluoride 1 is charged to the still 2 batchwise or continuously until the impurity concentration of the still rises to a selected level. A heating coil 3 supplies the vapor boil up to a distillation column 4. High purity HF vapor from the top of the column 4 passes to a condenser 5 and is liquefied. Part of the high purity HF liquid is returned to the top of the column 4 as reflux and the remainder of the liquid 6 is drawn off to storage.

Arsenic contents referred to herein are defined as the analysis obtained by the "Gutzeit" method for arsenic referenced Freeman, N. H., ed. Standard Methods of Chemical Analysis, (Sept., 1963), I, 118–124, and will be understood to possibly reflect antimony content as well as arsenic.

This invention is illustrated by the following examples wherein parts and percentages are by weight.

EXAMPLE 1

Using the apparatus shown in FIG. II, the column is a 0.75-inch inside diameter 316 stainless steel tube packed with 40 inches of 0.16-inch 316 stainless steel protruded metal packing. Nine-hundred ninety grams of hydrogen fluoride containing 72,000 ppb arsenic is charged to the still. The still is then heated to give a boil-up rate of approximately 25 grams per minute. Column pressure is controlled at 15.4 psia, and the overhead temperature is 293° K. The column is operated at total reflux for 2 hours. A vapor sample taken overhead from the column contains 100 ppb arsenic as measured by the Gutziet method. Distilling in a similar manner but varying the operating pressure the following results are obtained:

| Operating Pressure psia | Feed Composition, ppb Arsenic | Overhead Composition, ppb Arsenic | Overhead Temperature °K |
| --- | --- | --- | --- |
| 17.4 | 72,000 | 400 | 298 |
| 20.6 | 72,000 | 1,800 | 300 |
| 25 | 72,000 | 3,000 | 309 |

The operating conditions for carrying out the process of this invention are not narrowly critical except as regards the pressure limitations. A distillate temperature of from 209° to 299° K (−64° C. to +26° C.) will be the boiling point of pure hydrogen fluoride corresponding to the total pressure of 10 mm Hg absolute to 1,300 mm Hg absolute. The bottoms temperature will vary with the purity of the bottoms product and will range between 209° K and the boiling point of the impurities present at the pressure of the distillation.

Because a hydrogen fluoride product containing less than 100 ppb arsenic is often preferred as explained above, it is preferred to operate the process of this invention at pressures below 15 pounds per square inch absolute (776 mm Hg) as such operation produces hydrogen fluoride containing less than about 100 ppb arsenic.

While this process is specifically useful for removing arsenic from hydrogen fluoride, all other high boiling impurities such as antimony fluorosulfuric acid, sulfur, iron, sulfuric acid, and water are also removed.

I claim:

1. A process for producing high purity anhydrous hydrogen fluoride containing less than about 3,000 ppb arsenic from arsenic-containing hydrogen fluoride by distilling liquified arsenic-containing hydrogen fluoride at a pressure between approximately 10 mm Hg absolute and 1,300 mm Hg absolute and at a temperature between approximately −64° C. and +26° C. and removing the high purity anhydrous hydrogen fluoride as the overhead product.

2. A process of claim 1 wherein the liquified arsenic-containing hydrogen fluoride is distilled at a pressure between 10 mm Hg and 776 mm Hg.

* * * * *